Jan. 15, 1924.
C. DORNIER
ASSEMBLAGE POINT CONNECTION IN TUBULAR STRUCTURES
Filed Nov. 20, 1920
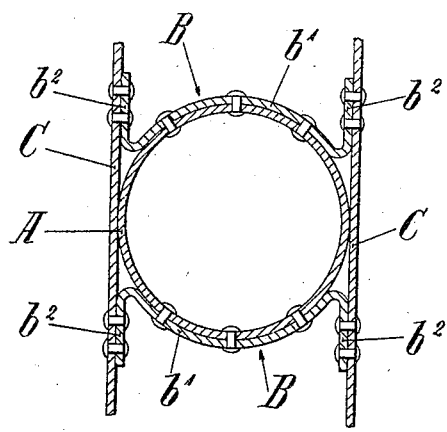
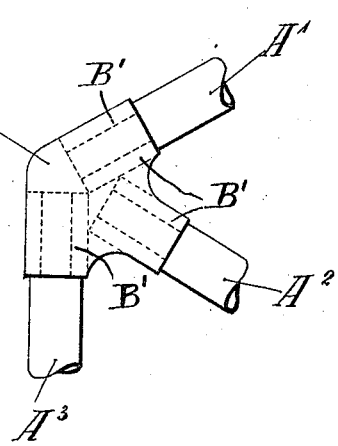
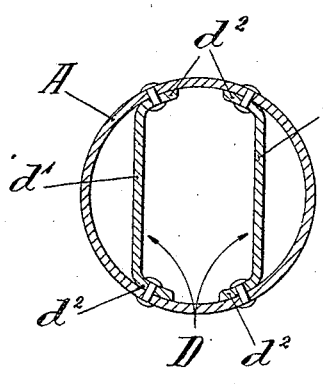
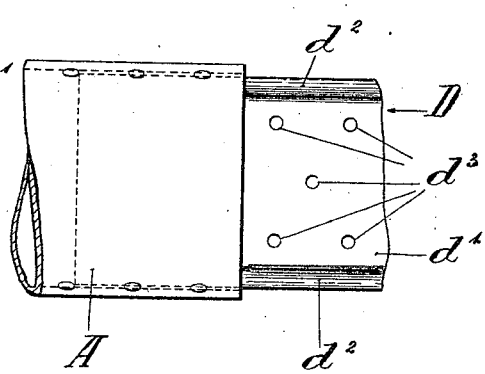
INVENTOR:

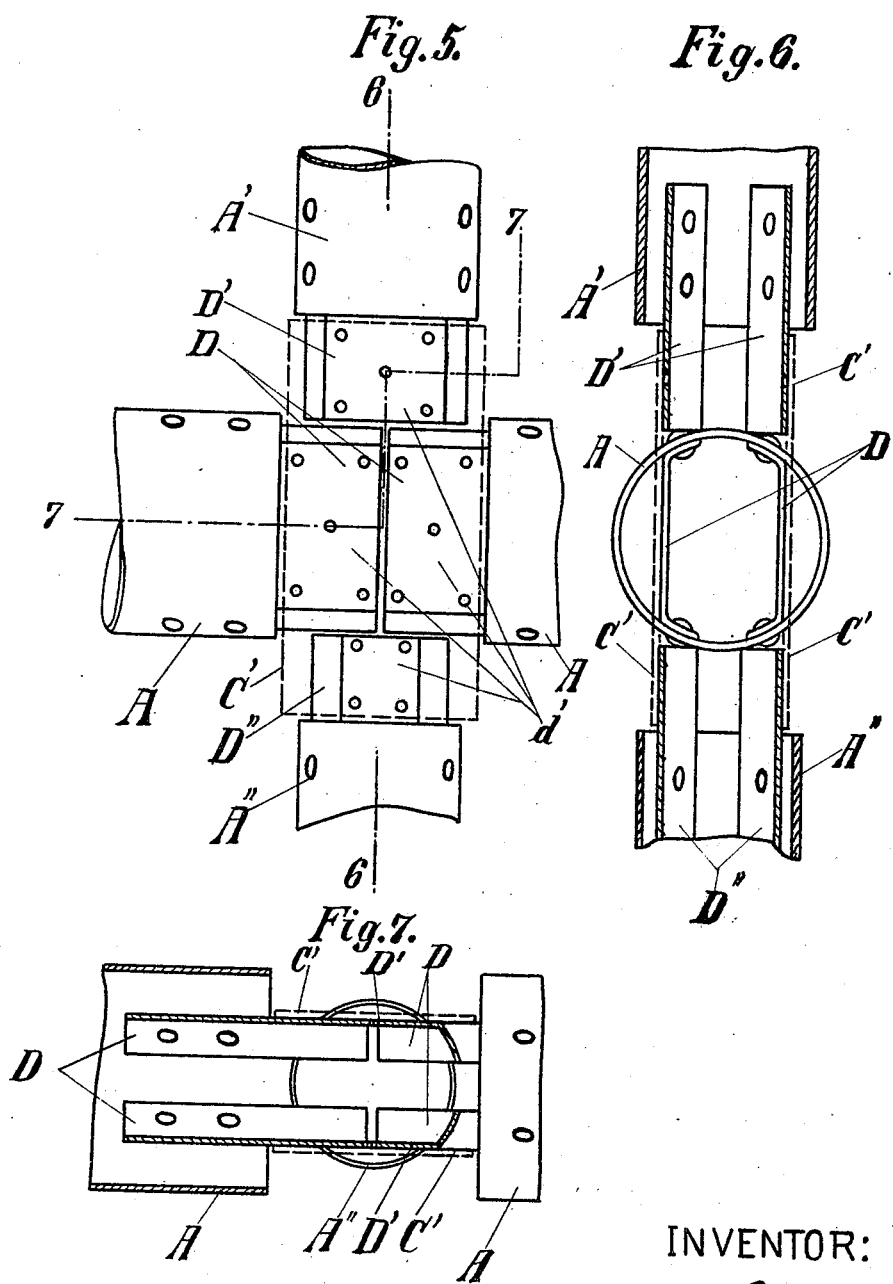

Patented Jan. 15, 1924.

1,480,854

UNITED STATES PATENT OFFICE.

CLAUDIUS DORNIER, OF FRIEDRICHSHAFEN, GERMANY, ASSIGNOR OF ONE-HALF TO DORNIER-METALLBAUTEN, GESELLSCHAFT MIT BESCHRÄNKTER HAFTUNG, OF FRIEDRICHSCHAFEN, GERMANY.

ASSEMBLAGE-POINT CONNECTION IN TUBULAR STRUCTURES.

Application filed November 20, 1920. Serial No. 425,586.

*To all whom it may concern:*

Be it known that I, CLAUDIUS DORNIER, a citizen of the German Empire, residing at Friedrichshafen, a/B., Germany, have invented certain new and useful Improvements in Assemblage-Point Connections in Tubular Structures (for which I have filed application for patent in Germany Oct. 13, 1917), of which the following is a specification.

My invention refers to tubes and similar structural parts narrowly curved and more especially to the construction of the connections thereof. Due to their curved mantle faces tubes have a section of greater resistance against bending and buckling stress than hollow bars with plane faces, but it is rather difficult in general to connect them with one another or to unite them into joints.

In order to render such connections possible the tube ends have until now been changed into outside flanges or they have been provided with slits, etc., into which special adapting pieces have been fitted. In spite thereof it was until now impossible to connect tubes in a simple manner with gusset joint plates or the like without changing their shape. The present invention avoids these drawbacks by providing the tubes with shoes in a peculiar way, which on account of their shape are easily made and easily to be joined on to the tubes as well as to be connected with plane faces such as gusset joint plates.

Thus the object of my invention is an assemblage point connection for frame work consisting of tubes or similar structural parts, in which sheet metal strips are partly connected with the tube, partly bent so that they run parallel to the plane of the gusset joint plate to which they are to be connected. According to the invention the plate strips are curved in correspondence to the curve of the tube in those parts destined to be connected with the tubes and they are made plane according to the shape of the gusset joint plates in the parts bent back for this connection.

The connections can be made at the ends of the tubes and intermediate the ends. In the latter case only an outside connection can be used, in which according to the invention the middle part of plate strips is riveted round the tube in question, while their free ends can be connected with the gusset joint plates. In an end connection, plate strips may be riveted into the tubes, while their plane middle parts are prolongated beyond the end of the tube for a connection with gusset joint plates situated beyond the tube end.

In the drawings—

Fig. 1 is a cross section of a tube connected with two gusset joint plates by means of two outside shoes, Fig. 2 is a view of an assemblage point connection for three tubes, Figs. 3 and 4 are a cross section and a side view, respectively, of a tube end provided with inner shoes, Fig. 5 is a side view of a plane assemblage point connection, corresponding to the construction in Figs. 3 and 4, of four tubes, and Figs. 6 and 7 are longitudinal sections along lines 6—6 and 7—7 in Fig. 5.

In the modification according to Fig. 1 two strips of sheet metal B lie closely against a tube A by having their middle part $b^1$ bent to match the curve of the tube. The distance between the strip ends $b^2$ parallel to each other is chosen so, that the gusset joint plates C which are to be riveted on, also touch the tube A outside.

Fig. 2 shows three tubes $A^1$, $A^2$, $A^3$ of equal diameter joined to lateral gusset joint plates C, one of which is only visible, by the aid of three pairs of sheet metal strips $B^1$ bent in a manner similar to the strips B in Fig. 1.

In the modification according to Figs. 3 and 4 two U-sections D possessing plane webs $d^1$ are inserted in a tube A and riveted on to the tube by correspondingly bent inside flanges $d^2$. The proportions are chosen so that the riveting tools can be handled easily. The connection of tube A with the gussets or any other plane constructural parts (not shown in the drawing) is done by riveting them on to the web parts $d'$ of the sections D prolongated beyond the end of the tube. Fig. 4 shows the rivet holes $d^3$ provided for the purpose.

In the connection according to Figs. 5–7 two tubes A of large diameter form a main boom, on which two tubes A' and A" of smaller and different diameters are joined as transverse bars. The connection with two gusset joint plates C' is effected by inserting four pairs of strips D, D', D'' of U-section similar to the construction shown in Figs 3 and 4. The middle parts d' of strips D, D', D'' corresponding to each other in pairs are equally distanced from all the four tubes A, A', A'', so that the gusset C' can be riveted directly on to all the middle parts d' without requiring any spacing plates.

I claim:

1. In a structural connection of the kind described in combination, a tube, a plane-faced structural member and a sheet metal gusset plate connected by rivets to both said tube and said member, the portion of said gusset plate adjoining said tube being curved so as to apply itself against the wall of said tube.

2. In a structural connection of the kind described in combination, a tube, a plane-faced structural member and a sheet metal gusset plate connected by rivets to both said tube and said member, part of said gusset plate being inserted in said tube and curved so as to apply itself against the wall of said tube.

In testimony whereof I affix my signature.

CLAUDE DORNIER.